Patented Apr. 16, 1946

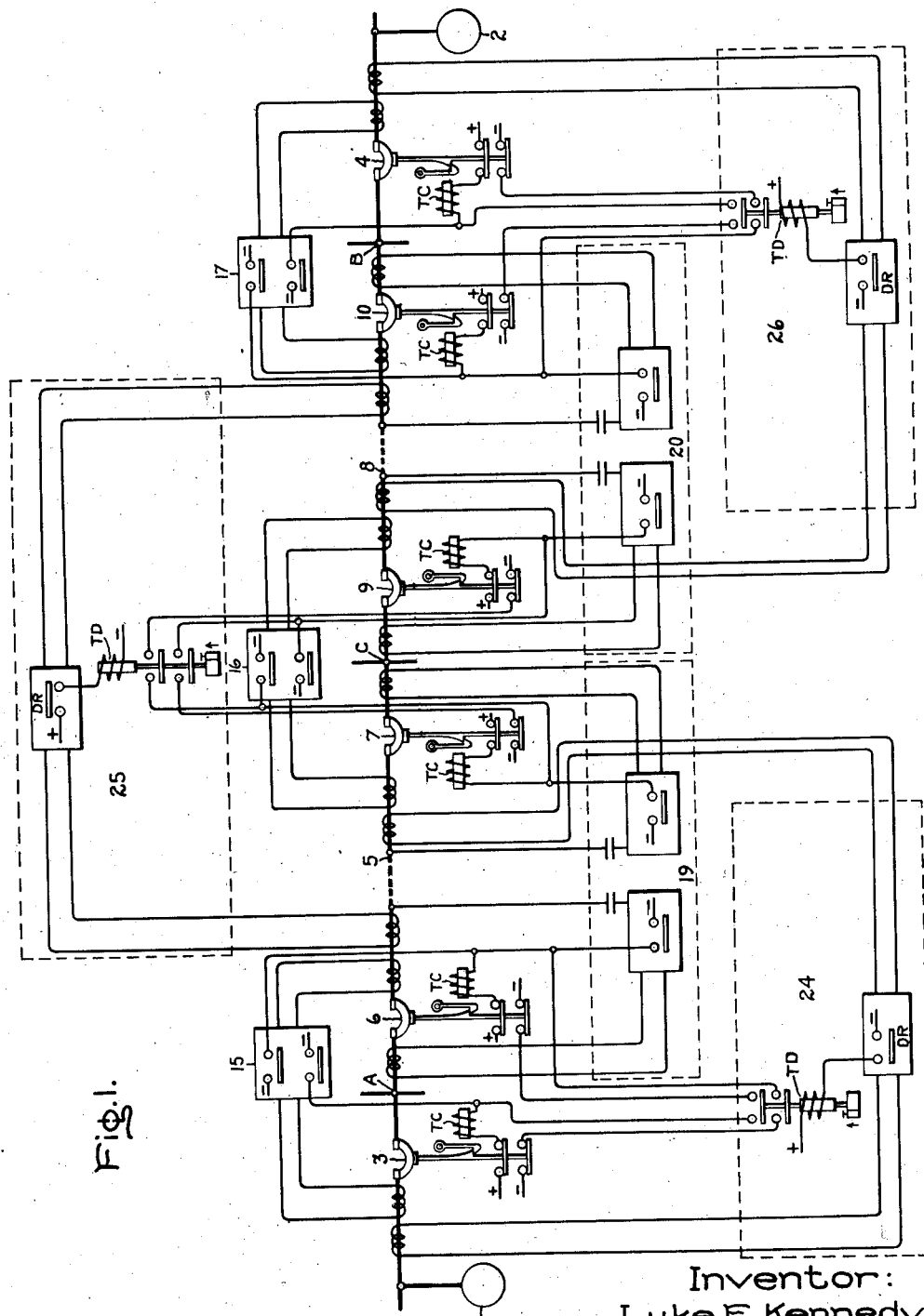

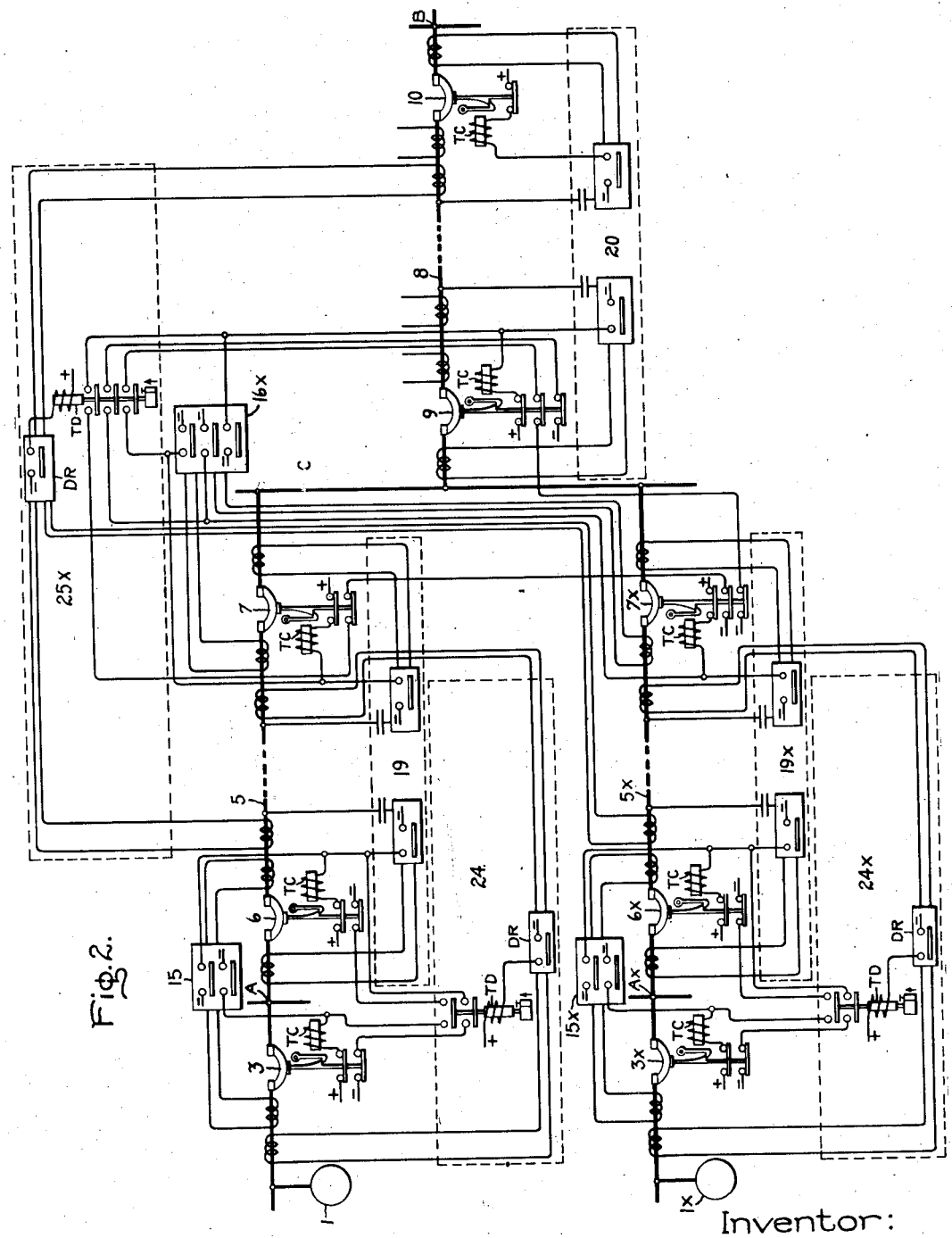

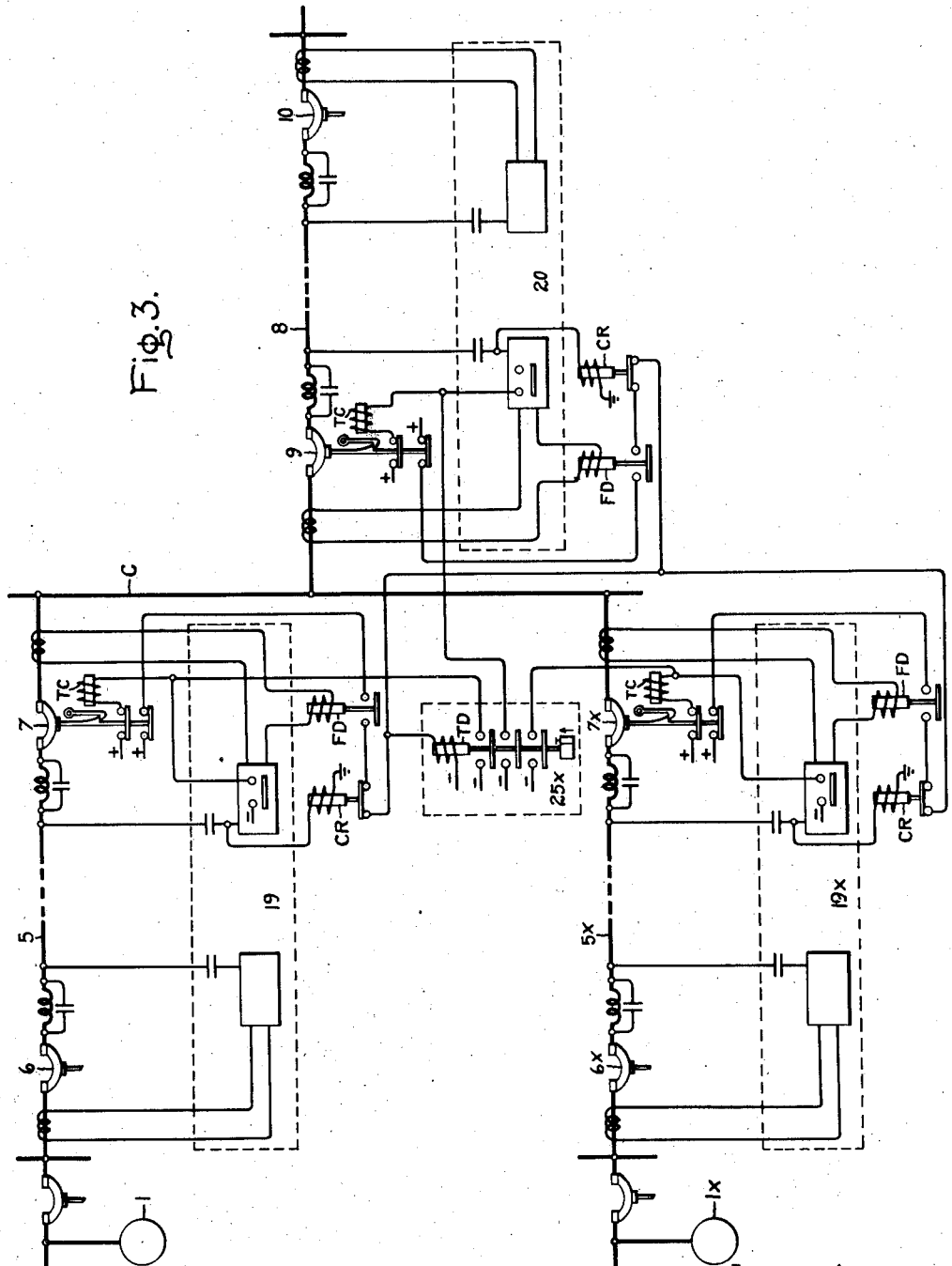

2,398,648

UNITED STATES PATENT OFFICE 2,398,648

PROTECTION OF ELECTRIC SYSTEMS

Luke F. Kennedy, Schenectady, N. Y., assignor to General Electric Company, a corporation of New York Application March 1, 1944, Serial No. 524,601

12 Claims. (Cl. 175—294)

My invention relates to improvements in the protection of electric systems and more particularly to improvements in the secondary or backup protection of sectionalized electric power systems so as to provide protection in case of failure of the primary protective apparatus of any section.

One object of my invention is to provide an improved back-up protective equipment for a line section of a sectionalized electric power system which effects the disconnection of a fault from the system with as little interruption of service to the rest of the system as possible, in case the primary protective equipment for the faulty section fails for any reason to disconnect the fault from the system.

A further object of my invention is to provide a back-up protective arrangement for each of a plurality of line sections connected to a common bus section which, in case the primary protective equipment associated with any one of the line sections fails to effect the disconnection of the line section from the bus section when a fault occurs on the line section, operates to effect the disconnection of the faulty section from the rest of the system by disconnecting all of the other line sections from the common bus section.

Another object of my invention is to provide an improved back-up protective equipment which requires a minimum of additional equipment over that basically required to give the normal primary protection.

Another object of my invention is to provide an improved back-up protective equipment of the differential type which is capable of operating more sensitively than back-up protective equipments employing overcurrent or distance relays which are sometimes unduly influenced by the effective impedance in the system.

My invention will be better understood from the following description when taken in connection with the accompanying drawings, and its scope will be pointed out in the appended claims.

In the accompanying drawings, Fig. 1 illustrates schematically in single line diagram a sectionalized transmission system embodying my invention, and Figs. 2 and 3 respectively illustrate schematically in single line diagram modifications of a portion of the system shown in Fig. 1.

In Fig. 1, I have illustrated a sectionalized transmission line interconnecting the station bus sections A and B, respectively energized by suitable sources of power 1 and 2 through the circuit interrupters 3 and 4. The transmission line is shown as comprising one intermediate substation bus section C. The bus sections A and C are respectively connected to a line section 5 of the transmission line by the circuit interrupters 6 and 7. The bus sections C and B are respectively connected to a line section 8 of the transmission line by the circuit interrupters 9 and 10.

Each station bus section and each line section of the transmission line may be provided with any well-known type of protective equipment for effecting a quick opening of the circuit interrupters at the ends thereof in response to a fault on the respective bus or line section. Preferably the protective equipments for the adjacent portions of the transmission system overlap in a manner well known in the art.

For the purpose of illustrating my invention, I have schematically shown the station bus sections A, B and C as being respectively provided with bus differential protective equipments 15, 17 and 16, which may be of any of the well-known types, and the line sections 5 and 8 of the transmission line as being respectively provided with the protective equipments 19 and 20, which may be of any of the transmitted auxiliary current control types. The bus differential protective equipment 15 is normally arranged in a well-known manner to effect the quick opening of the circuit interrupters 3 and 6 in response to a fault on the bus section A. Similarly, the bus differential protective equipment 16 is normally arranged to effect the quick opening of the circuit interrupters 7 and 9 in response to a fault on the bus section C, and the bus differential protective equipment 17 is normally arranged to effect the quick opening of the circuit interrupters 4 and 10 in response to a fault on the bus section B. The protective equipment 19 for the line section 5, which is schematically shown as being of the carrier current type, is normally arranged in a manner well known in the art to effect the quick opening of the circuit interrupters 6 and 7 at the ends of the line section 5 when a fault occurs thereon; and, similarly, the protective equipment 20, which is shown as being of the same type as the equipment 19, is normally arranged to effect the quick opening of the circuit breakers 9 and 10 at the ends of the line section 8 when a fault occurs thereon. The fault responsive devices of the adjacent protective equipments 15, 16, 17, 19 and 20 are connected to the electric system in a well-known overlapping manner so as to ensure that a fault anywhere between the circuit interrupters 3 and 4 normally initiates the operation of at least one of the protective equipments to disconnect the fault from the system.

With the various protective equipments arranged in the manner heretofore described, it is evident that, if each protective equipment functions properly, a fault any where on the transmission system results in the immediate disconnection of the faulty line or bus section from the system. For example, if a fault occurs on the line section 8, the protective equipment 20 normally effects the quick opening of the circuit interrupters 9 and 10. Similarly, if a fault occurs on the bus section C, the protective equipment 16 normally effects the quick opening of the circuit interrupters 7 and 9. If, however, in case of a fault on the line section 8, the protective equipment 20 fails to function properly, or, for any reason, the circuit interrupter 9 fails to open in response to a fault on the line section 8, it is desirable to have available some other protective equipment which will operate, after the protective equipment 20 and circuit interrupters 9 and 10 have had time to function properly, to open only the closed circuit interrupters through which current is flowing to the fault from the adjacent sections of the system. For example, if the circuit interrupter 10 is opened properly but the circuit interrupter 9 fails to be opened by the protective equipment 20 in response to a fault on the line section 8, it is desirable to have the back-up protective equipment effect only the opening of the circuit interrupter 7 so as to disconnect the fault from the line section 5 in order that the rest of the system to the left of the circuit interrupter 7 may continue in operation.

In accordance with my invention, I provide each of the bus sections A, B and C with a back-up protective arrangement which is arranged to respond not only to a fault on the respective bus section but also to a fault on any of the line sections connected to the respective bus section. For example, for the bus section A I provide a back-up protective equipment 24 which may be a current differential protective equipment of any well-known type that is arranged to be operated in response to a fault between the circuit interrupter 3 and the circuit interrupter 7. Similarly, I provide for the bus section C a back-up protective equipment 25 which comprises a current differential protective equipment of any well-known type that is arranged to be responsive to a fault anywhere between the circuit interrupter 6 and the circuit interrupter 9, and a back-up protective equipment 26 for the bus section B which comprises a current differential protective equipment of any well-known type that is arranged to be responsive to a fault between the circuit interrupter 9 and the circuit interrupter 4. Each of these differential protective equipments 24, 25, and 26, as is well known in the art, is responsive to the algebraic sum of the currents flowing at the remote ends of the line sections connected to the associated bus section.

Each of the back-up protective equipments is schematically shown as comprising a differential relay DR, which is arranged to close its contacts and complete an energizing circuit for an associated timing device TD when a fault occurs within a portion of the system protected by the respective back-up protective equipment. Each timing device TD, in turn, is arranged so that after being continuously operated for a predetermined time it completes energizing circuits for the trip coils TC of all of the circuit interrupters that connect the associated bus section to the system if they are all closed at that time. For example, the timing device TD of the back-up protective equipment 24 is arranged to complete energizing circuits for the trip coils TC of the circuit interrupters 3 and 6, if both of these circuit interrupters are closed at the time this timing device TD completes its timing operation. This result is accomplished by connecting in each trip coil energizing circuit which is arranged to be completed by the timing device, auxiliary contacts of the other circuit interrupter which are closed only when the other circuit interrupter is closed.

In a similar manner, the timing device TD of the back-up protective equipment 25 is arranged to complete energizing circuits for the trip coils TC of the circuit interrupters 7 and 9, and the timing device TD of the back-up protective equipment 26 is arranged to complete energizing circuits for the trip coils TC of the circuit interrupters 4 and 10.

Normally, when a fault occurs on any line section of the system, the associated primary protective equipment effects the quick opening of the circuit interrupters at the ends thereof to disconnect the faulty line section from the system. For example, if a fault occurs on the line section 5, the primary protective equipment 19 normally effects the quick opening of the circuit interrupters 6 and 7. Since the line section 5 is included within the portions of the electric system respectively protected by the back-up protective equipments 24 and 25, a fault on the line section 5 causes the differential relays DR of these two back-up protective equipments to close their respective contacts and initiate the timing operations of the associated timing devices TD. However, if the primary protective equipment functions properly, the circuit interrupters 6 and 7 are both opened, and the fault is disconnected from the system, and the back-up protective equipments 24 and 25 are rendered inoperative before their respective timing devices TD complete their timing operations. However, if one of the circuit interrupters, such, for example, as 7, fails to open, the fault remains connected to the line section protected by the back-up protective equipment 25 long enough for the associated timing device TD to close its contacts and effect the opening of the circuit interrupter 9 so as to disconnect the fault from the system by disconnecting both the faulty line section 5 and the bus section C, which is the only bus section supplying current to the fault. The failure of the circuit interrupter 7 to open also causes the timing device TD associated with the back-up protective equipment 24 to close its contacts, but the closing of these contacts at this time does not complete the energizing circuits for the trip coils TC of the circuit interrupters 3 and 6 because these circuits are open at the auxiliary contacts of the open circuit interrupter 6. If the circuit interrupter 6 is the one to fail to open in response to the operation of the primary protective equipment 19, the back-up protective equipment 24 operates to effect after a predetermined time interval the opening of the circuit interrupter 3 so as to disconnect the fault from the system by disconnecting both the faulty line section 5 and the bus section A, which is the only bus section supplying current to the fault. The failure of the circuit interrupter 6 to open also causes the timing device TD associated with the back-up protective equipment 25 to close its contacts, but the operation of this timing device at this time does not effect the opening of the circuit interrupter 9 because the circuit of its trip coil TC is open at the auxiliary contacts of the open circuit interrupter 7. Similarly, in case the circuit interrupter 9 fails to open in response to the operation of the primary protective equipment 20, when a fault occurs on the line section 8, the back-up protective equipment 25 effects after a predetermined time delay the opening of the circuit interrupter 7, but the back-up protective equipment 26 does not effect the opening of the circuit interrupter 4. In case the circuit interrupter 10 fails to open in response to the operation of the primary protective equipment 20, when a fault occurs on the line section 8, the back-up protective equipment 26 effects after a predetermined time delay the opening of the circuit interrupter 4, but the back-up protective equipment 25 does not effect the opening of the circuit interrupter 7.

Therefore, it will be obvious that, in the embodiment of my invention shown in Fig. 1, when a circuit interrupter between a line section and a bus section fails to open in response to a fault on the line section, a back-up protective equipment functions to disconnect from the system only the bus section which is supplying current to the faulty line section.

In the modification of Fig. 1 shown in Fig. 2, the bus section C is assumed to be connected to another source $1x$ by means of a line section $5x$, one end of which is connected to the bus section C by a circuit interrupter $7x$ and the other end of which is connected by a circuit interrupter $6x$ to a bus section $Ax$, which in turn is connected to the source $1x$ by a circuit interrupter $3x$. The bus section $Ax$ is provided with a bus differential protective equipment $15x$ of any suitable type for normally effecting the quick opening of the circuit interrupters $3x$ and $6x$ in response to a fault on the bus section $Ax$. The line section $5x$ is provided with a protective equipment $19x$ of any suitable type for normally effecting the quick opening of the circuit interrupters $6x$ and $7x$ in response to a fault on the line section $5x$. The bus section C is provided with a bus differential protective equipment $16x$ of any suitable type for normally effecting the quick opening of the circuit interrupters 7, $7x$, and 9 in response to a fault on the bus section C. The line section 8 is provided with the same primary protective equipment 20 as in Fig. 1 for normally effecting the quick opening of the circuit interrupters 9 and 10 in response to a fault on the line section 8.

The back-up protective equipment 24 for the bus section A is the same as in Fig. 1, and the back-up protective equipment $24x$ for the bus section $Ax$ is similar to the back-up protective equipment 24, except that it functions in response to a fault between the circuit interrupter $3x$ and the circuit interrupter $7x$.

The back-up protective equipment $25x$ for the bus section C is similar to the back-up protective equipment 25 of Fig. 1, except that it is also responsive to faults between the circuit interrupter $6x$ end of the line section $5x$ and the bus section C and effects the opening of all of the circuit interrupters 7, $7x$, and 9 if they are all closed at the time the associated timing device TD closes its contacts. This result is accomplished by including in series, in each trip coil energizing circuit which is arranged to be completed by the timing device TD of the back-up protective equipment $25x$, auxiliary contacts, of all of the circuit interrupters, which are closed only when the respective circuit interrupters are closed.

In case of a fault on the line section 8 in Fig. 2, the associated primary protective equipment 20 normally effects the quick opening of the circuit interrupters 9 and 10 before the timing device TD of the back-up protective equipment $25x$ completes its timing operation. However, if the circuit interrupter 9 opens but the circuit interrupter 10 fails to open in response to the operation of the primary protective equipment 20, the timing device TD of the back-up protective equipment 25 completes its timing operation, but the closing of its contacts has no effect as all of the trip coil energizing circuits controlled thereby are interrupted at the auxiliary contacts on the open circuit interrupter 9. Therefore, the failure of the circuit interrupter 10 to open does not result in the opening of the circuit interrupters 7 and $7x$.

If, however, the circuit interrupter 10 opens but the circuit interrupter 9 fails to open in response to the operation of the primary protective equipment 20, the energizing circuits for the trip coils TC of the circuit interrupters 7, $7x$, and 9 are completed by the timing device TD of the back-up protective equipment $25x$ as soon as it completes its timing operation. Therefore, the failure of the circuit interrupter 9 to open in response to the operation of the primary protective equipment 20 results only in the disconnection of the line section 8 and the bus section C from the system.

In case of a fault on the line section 5, the associated primary protective equipment 19 and the back-up protective equipment 24 operate in the same manner as in Fig. 1. The back-up protective equipment $25x$ also operates in the same manner as the back-up protective equipment 25 in Fig. 1, except that, when the circuit interrupter 7 fails to open, the back-up protective equipment $25x$ effects the opening of the circuit interrupter $7x$ as well as the circuit interrupter 9 so that the bus section C and the line section 5 are disconnected from the system.

In case of a fault on the line section $5x$, the associated primary protective equipment $19x$ normally effects the quick opening of the circuit interrupters $6x$ and $7x$ before the timing devices TD of the back-up protective equipments $24x$ and $25x$ complete their respective timing operations. However, if the circuit interrupter $7x$ opens but the circuit interrupter $6x$ fails to open in response to the operation of the primary protective equipment $19x$, the timing devices TD of both of the back-up protective equipments $24x$ and $25x$ complete their respective timing operations. The closing of the contacts of the timing device TD of the back-up protective equipment $25x$ has no effect at this time as all of the trip coil energizing circuits controlled thereby are interrupted at the auxiliary contacts of the open circuit interrupter $7x$. The closing of the contacts of the timing device TD of the back-up protective equipment $24x$, however, completes energizing circuits for the circuit interrupters $3x$ and $6x$ so that both the line section $5x$ and the station bus $Ax$ are isolated from the rest of the system.

If the circuit interrupter $6x$ opens but the circuit interrupter $7x$ fails to open in response to the operation of the primary protective equipment $19x$, the timing device TD of the back-up protective equipment $25x$ effects after a time delay the opening of the circuit interrupters 7 and 9, but the operation of the timing device TD of the back-up protective equipment $24x$ has no effect at this time as the energizing circuit of the trip coil TC of the circuit interrupter $3x$ is interrupted at the auxiliary contacts of the open circuit interrupter $6x$. Therefore, the failure of the circuit interrupter $7x$ to open results in the disconnection of both the line section 5x and the bus section C from the rest of the system.

Therefore, it will be seen that when a fault occurs on any line section and the faulty line section remains connected to a station bus for a predetermined time, means are provided for isolating, from the rest of the system, the faulty section and the bus section to which it remains connected.

In the modification of Fig. 1 shown in Fig. 3, I have illustrated schematically another arrangement for effecting the operation of the timing device TD of the back-up protective equipment 25x when a circuit interrupter in the line section 5, 5x, or 8 fails to open in response to the operation of the associated primary protective equipment. In this arrangement, it is assumed that the primary protective equipments 19, 19x, and 20 are of the well-known type of carrier current protective equipment in which blocking current of a predetermined carrier frequency is transmitted over the carrier channel when the fault current in the associated line section is due to a fault outside of the line section and no blocking current of carrier frequency is transmitted over the carrier channel when the fault current in the line section is due to a fault within the line section. At the bus section C end of the line section 5, I provide a frequency relay CR, which is connected to the line section 5 so that the contacts of the relay CR are opened in response to the presence of blocking current in the line section 5. Also, at the bus section C end of the line section 5, I provide a suitable fault detecting relay FD, which is arranged to close its contacts in response to the flow of fault current between the bus section C and the line section 5. When the circuit interrupter 7 is closed and the contacts of both of the associated relays CR and FD are closed, an energizing circuit is completed for the timing device TD of the back-up protective equipment 25x. Similar frequency and fault detecting relays are provided at the bus section C ends of the line sections 5x and 8 for completing similar energizing circuits for the timing device TD of the back-up protective equipment 25x. Also, similar frequency and fault detecting relays (not shown) are provided at the other ends of the line sections 5, 5x, and 8 to control the timing devices TD of the back-up protective equipments at those respective ends.

When a fault occurs on any one of the line sections in Fig. 3, such, for example, as the line section 5, the fault current in the faulty line section causes the associated fault detecting relay FD to close its contacts and complete an energizing circuit for the timing device TD of the back-up protective equipment 25x because no blocking current is transmitted by the primary protective equipment 19 in response to a fault on the line section 5. Before the timing device TD can complete its timing operation, when a fault occurs on the line section 5, the timing device TD is normally rendered inoperative by the primary protective equipment 19 effecting the opening of the circuit interrupters 6 and 7. However, if the circuit interrupter 7 fails to open so that fault current continues to flow from the bus section C to the faulty line section 5 and no blocking current is transmitted over the line section 5, the timing device TD is energized long enough for it to close its contacts and complete energizing circuits for the trip coils TC of the circuit interrupters 7, 7x, and 9, thereby effecting the disconnection of the line section 5 and the bus section C from the rest of the system. Although the fault on the line section 5 may also cause the fault detecting relays FD at the bus section C ends of the line sections 5x and 8 to close their respective contacts, these fault detecting relays do not complete energizing circuits for the timing device TD because the contacts of their associated frequency relays CR are open since a fault on the line section 5 is outside of the line sections 5x and 8 and, therefore, causes blocking current to be transmitted over both of these sections as long as the circuit interrupter 7 remains closed.

While I have, in accordance with the patent statutes, shown and described my invention as applied to a particular electric system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a protective arrangement for an electric system having a bus section and a plurality of line sections connected to said bus section, the combination of an individual protective means for each line section responsive to a fault thereon for normally effecting the quick disconnection thereof from said bus section, and a time delayed back-up protective equipment connected to said line sections so as to be responsive to a fault on any line section connected to said bus section for disconnecting all of said line sections from said bus section.

2. In a protective arrangement for an electric system having a bus section and a plurality of line sections connected to said bus section, the combination of an individual protective means for each line section responsive to a fault thereon for normally effecting the quick disconnection thereof from said bus section, and a time delayed differential protective equipment for said bus section connected to each of said line sections at the end thereof remote from said bus section so as to be responsive to a fault on any line section connected to said bus section.

3. In a protective arrangement for an electric system having a bus section and a plurality of line sections connected to said bus section, the combination of an individual protective means for each line section responsive to a fault thereon for normally effecting the quick disconnection thereof from said bus section, timing means, means connected to all of said line sections so as to effect the operation of said timing means in response to a fault on any of said line sections while it is connected to said bus section, and means controlled by said timing means for disconnecting all of said line sections from said bus section.

4. In a protective arrangement for an electric system having a bus section and a plurality of line sections connected to said bus section, the combination of an individual primary protective equipment for each line section responsive to a fault thereon for normally effecting the quick disconnection thereof from said bus section, and a time delayed differential protective equipment connected to each of said line sections at the end thereof remote from said bus section so as to be responsive to a fault on any line section while connected to said bus section for effecting the disconnection of all of said line sections from said bus section.

5. In a protective arrangement for an electric system having a bus section and a plurality of line sections connected to said bus section, the combination of an individual protective means for each line section responsive to a fault thereon for normally effecting the quick disconnection therof from said bus section, and a time delayed back-up protective equipment connected to all of said line sections so as to be responsive to a fault on any line section connected to said bus section for disconnecting all of said line sections from said bus section only when the line section to which the fault is connected fails to be disconnected from said bus section by said first mentioned means.

6. In a protective arrangement for an electric system having a bus section and a plurality of line sections connected to said bus section, the combination of an individual primary protective equipment for each line section responsive to a fault thereon for normally effecting the quick disconnection thereof from said bus section, and a time delayed differential protective equipment connected to each of said line sections at the end thereof remote from said bus section so as to be responsive to a fault on any line section while connected to said bus section for effecting the disconnection of all of said line sections from said bus section only when the primary protective equipment for the line section to which the fault is connected fails to disconnect the faulty line section from said bus section.

7. In a protective arrangement for an electric system having a bus section and a plurality of line sections connected to said bus section, the combination of an individual protective means for each line section responsive to a fault thereon for normally effecting the quick disconnection thereof from said bus section, and a time delayed protective equipment for said bus section connected to said line sections so as to be responsive to the relative directions of the currents at the remote ends of said line sections to effect the disconnection of all of said line sections from said bus section.

8. In a protective arrangement for an electric system having a bus section and a plurality of line sections connected to said bus section, the combination of an individual protective means for each line section responsive to a fault thereon for normally effecting the quick disconnection thereof from said bus section, and a time delayed differential protective equipment for said bus section connected to each of said line sections at the end thereof remote from said bus section so as to respond to the relative directions of the current at the remote ends of the line sections connected to said bus section to effect the disconnection of all of said line sections from said bus section.

9. In a protective arrangement for an electric system having a bus section and a plurality of line sections connected to said bus section, the combination of an individual primary protective equipment of the transmitted auxiliary current control type for each of said line sections comprising means for producing a predetermined auxiliary current condition at the bus section end of a line section when a fault is connected to the line section, individual fault responsive means connected to each line section at the bus section end thereof, and means controlled by said auxiliary current condition and said fault responsive means of a line section to which a fault is connected for effecting the disconnection of all of said line sections from said bus section when the fault remains connected to the line section for a predetermined time.

10. In a protective arrangement for an electric system having a bus section and a plurality of line sections connected to said bus section, the combination of an individual primary protective equipment of the transmitted auxiliary current control type for each of said line sections comprising means for producing a predetermined auxiliary current condition at the bus section end of a line section when a fault is connected to the line section, individual fault responsive means connected to each line section at the bus section end thereof, and means controlled by said fault responsive means and the existence in one of said protective equipments of said auxiliary current condition for a predetermined time while fault current is flowing between said bus section and the associated line section for effecting the disconnection of all of said line sections from said bus section.

11. In a protective arrangement for an electric system having a bus section and a plurality of line sections connected to said bus section, the combination of an individual primary protective equipment for each line section, each primary protective equipment being of the type in which an auxiliary current is transmitted to prevent the disconnection from said bus section of the associated line section in response to a fault outside the associated line section and in which auxiliary current is not transmitted to effect the disconnection from said bus section of the associated line section in response to a fault on the associated line section, individual fault responsive means connected to each line section at the bus section end thereof, and means controlled by said fault responsive means and the nontransmittal of auxiliary current by the associated primary protective equipment for a predetermined time interval while a fault exists on a line section connected to said bus section for effecting the disconnection of all of the other line sections from said bus section.

12. In a protective arrangement for an electric system having a bus section and a plurality of line sections connected to said bus section, the combination of an individual primary protective equipment for each line section, each primary protective equipment being of the type in which an auxiliary current is transmitted to prevent the disconnection from said bus section of the associated line section in response to a fault outside the associated line section and in which auxiliary current is not transmitted to effect the disconnection from said bus section of the associated line section in response to a fault on the associated line section, individual fault responsive means connected to each line section at the bus section end thereof, and means jointly controlled by said fault responsive means upon the flow of fault current between said bus section and one of said line sections and by the nontransmittal for a predetermined time interval of auxiliary current by the primary protective equipment associated with the faulty line section for effecting the disconnection of all of the other line sections from said bus section.

LUKE F. KENNEDY.